US008797571B2

(12) United States Patent
Kong

(10) Patent No.: US 8,797,571 B2
(45) Date of Patent: Aug. 5, 2014

(54) HOST DEVICE AND METHOD TO SET DISTRIBUTED PRINTING

(75) Inventor: Tae-kook Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1188 days.

(21) Appl. No.: 12/046,774

(22) Filed: Mar. 12, 2008

(65) Prior Publication Data

US 2009/0009795 A1 Jan. 8, 2009

(30) Foreign Application Priority Data

Jul. 2, 2007 (KR) .................................. 2007-66237

(51) Int. Cl.
*G06F 3/12* (2006.01)

(52) U.S. Cl.
USPC ..... 358/1.15; 358/1.9; 358/3.23; 358/426.05; 358/501; 715/274; 715/277; 715/739; 715/747

(58) Field of Classification Search
CPC .......... H04N 1/00063; H04N 1/00082; H04N 1/00885–1/00904
USPC ........ 712/28–29; 715/700–866; 358/1.1–3.29
See application file for complete search history.

(56) References Cited

U.S. PATENT DOCUMENTS

| 2003/0011812 A1* | 1/2003 | Sesek et al. .................. 358/1.15 |
| 2004/0136023 A1* | 7/2004 | Sato ............................ 358/1.13 |
| 2004/0233469 A1* | 11/2004 | Kato .......................... 358/1.13 |
| 2004/0236771 A1* | 11/2004 | Colver et al. ................. 707/100 |
| 2005/0028073 A1* | 2/2005 | Henry et al. ................. 715/500 |
| 2007/0103726 A1* | 5/2007 | Iwata et al. ................. 358/1.15 |

FOREIGN PATENT DOCUMENTS

| JP | 11-296333 | 10/1999 |
| JP | 2001-134403 | 5/2001 |
| JP | 2001-290622 | 10/2001 |
| JP | 2004-181647 | 7/2004 |

OTHER PUBLICATIONS

Korean Office Action dated Sep. 25, 2013 issued in KR Application No. 10-2007-0066237.

* cited by examiner

*Primary Examiner* — Benny Q Tieu
*Assistant Examiner* — Marcellus Augustin
(74) *Attorney, Agent, or Firm* — Stanzione & Kim, LLP

(57) ABSTRACT

A host device and method for a distributed printing setup includes a plurality of image forming apparatuses registered to a database and a user interface (UI) generator to generate a UI screen to generate a workflow relating to the image forming apparatuses. When the distributed printing setup of a file to be printed is requested on the generated UI screen, a workflow generator generates a workflow by combining the image forming apparatuses to distribute the printing job to the registered image forming apparatuses.

24 Claims, 11 Drawing Sheets

FIG. 7

| Job History List | | | | | | | | |
|---|---|---|---|---|---|---|---|---|
| ALL ▶ | ALL ▶ | ● | From: | To: | | Search | | |
| Index | Data | LoginID | Domain | Device Name | IP Address | Workflow | File Name | Result |
| 1 | 4/25/07... | | | SEC0000A... | 10.88.195.130 | SCAN-PRINTER | Not Available | Suc... |
| 1 | 4/25/07... | | | SEC0000A... | 10.88.195.130 | SCAN-PRINTER(Mult | Not Available | Fail |

Property Information

LoginID : User
      Device Name : SEC0000AA961BE7
         Filename : Not Available
    Workform Name : SCAN-PRINTER(Multiple)
     Processed at : Server
    Finished Time : AM 10:00:43 Friday 4/25/07
           Result : Fail Workform Information Number of Copies : 7
        Orientation : Portrait
       Printer Name : Printer(Distributed Printing)

Number of Copies : 4
       Printer Name : CLP-300
             Result : Success Number of Copies : 3
       Printer Name : CLP-600
             Result : Fail

[ Close ]

HOST DEVICE AND METHOD TO SET DISTRIBUTED PRINTING

CROSS-REFERENCE TO RELATED APPLICATIONS

This application claims priority under 35 U.S.C. §119(a) from Korean Patent Application No. 10-2007-0066237, filed on Jul. 2, 2007, in the Korean Intellectual Property Office, the disclosure of which is incorporated herein by reference in its entirety.

BACKGROUND OF THE INVENTION

1. Field of the Invention

The present general inventive concept relates generally to a host device and method to set a distributed printing. More particularly, the present general inventive concept relates to a host device to set a distributed printing to generate a workflow to print the same document at a plurality of image forming apparatuses, and a distributed printing setup method.

2. Description of the Related Art

In a system using an image forming apparatus having a printing function and a web server, a plurality of host devices generally shares a plurality of image forming apparatuses over a network. With advances of communication technology, a document delivery system is being developed.

In a conventional system, a user manages the image forming apparatuses by accessing to a server or using a program separately installed to a user terminal. That is, the user requests an operation supported by the system using the server or the user terminal including the separate program.

The operation supported by the system includes 'Scan to printer' by way of example. By accessing the server, the user generates and stores a workflow 'Scan to printer' in advance and then requests the stored 'Scan to printer'. When 'Scan to printer' is requested, the image forming apparatus scans the placed document, converts the scanning data to a printable format, and prints the data on printing media. In doing so, the printing on the printing media is performed only at one of the image forming apparatuses. For instance, when the scanning data is printed on 100 or 1000 sheets of paper, the printing job is performed only by one apparatus. As a result, the conventional printing method causes a load to the designated image forming apparatus and the user has to wait for a long time to acquire the prints.

SUMMARY OF THE INVENTION

The present general inventive concept provides a host device to set a distributed printing to enhance the printing efficiency by distributing a number of copies to a plurality of image forming apparatuses, and a distributed printing setup method.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a host device for a distributed printing setup includes a user interface (UI) generator to generate, when the generation of a workflow for a distributed printing using a plurality of image forming apparatuses is requested, a UI screen to generate the workflow, and a workflow generator to generate, when the image forming apparatuses are selected in the generated UI screen, the workflow by combining distributed printing setup of the selected image forming apparatuses to distribute a printing job of a file to be printed.

The workflow generator may distribute a total number of copies set for the file to be printed to the selected image forming apparatuses, and generate a workflow including the distributed copies.

The workflow generator may change the generated workflow when a number of copies allotted to one of the selected image forming apparatuses increases or decreases.

The host device may further include a storage to store the workflow including the allotted number of copies to the selected image forming apparatuses respectively.

The workflow generator may equally distribute the total number of copies.

The workflow generator may equally distribute the total number of copies by dividing the total number of copies by a number of the selected image forming apparatuses. When there is a remainder after dividing the total number of copies by the number of the selected image forming apparatuses, the workflow generator may allot a number of additional copies corresponding to the remainder by providing one copy to each of the image forming apparatuses in order from a highest image forming apparatus, respectively.

The workflow for the distributed printing may include scan data, e-mail, fax data, and data stored to a folder.

The host device may further include a display unit to display the generated UI screen, and a user input unit to authenticate a user for the workflow generation, and requesting the distributed printing through the UI screen displayed in the display unit when the user authentication is completed.

The host device may further include a communication unit to communicate with at least one user terminal, and a host controller to control, when the distributed printing setup is requested from the user terminal, the communication unit to send a UI screen for the workflow generation to the user terminal. The selected image forming apparatuses can be selected in the UI screen displayed in the user terminal.

The host device may further include a communication unit to communicate with the image forming apparatuses over a communication network, and a host controller to control, when user authentication is requested from one of the image forming apparatuses and the user authentication is completed, the communication unit to send a workflow list mapped and stored to the user to the one image forming apparatus.

The UI generator may generate a UI screen illustrating success or failure of the distributed printing executed by the selected image forming apparatuses.

The foregoing and/or other aspects and utilities of the general inventive concept may also be achieved by providing a distributed printing setup method includes requesting, by a plurality of image forming apparatuses, to generate a workflow for a distributed printing, displaying a user interface (UI) screen for the workflow generation, selecting the image forming apparatuses in the displayed UI screen, and generating a workflow by combining distributed printing setup of the selected image forming apparatuses to distribute a printing job of a file to be printed.

The generating operation may include distributing a total number of copies of the file to be printed to the image forming apparatuses, and generating a workflow including the distributed numbers of copies.

The distributing operation may equally distribute the total number of copies to the selected image forming apparatuses.

The distributed printing setup method may further include generating a UI screen illustrating success or failure of the distributed printing executed by the selected image forming apparatuses.

The foregoing and/or other aspects and utilities of the general inventive concept may also be achieved by providing a distributed printing system including a plurality of image forming apparatuses, a host device including a user interface (UI) generator to display a UI screen to select two or more of the plurality of image forming apparatuses which to distribute printing jobs, and a workflow generator, wherein the workflow generator generates workflow by combining a distributed printing setup of the selected image forming apparatuses to distribute the respective printing jobs.

The workflow generator may distribute a total number of print jobs among the selected image forming apparatuses such that a number of printing jobs distributed to each of the selected image forming apparatuses differ from each other by no more than one print job.

The foregoing and/or other aspects and utilities of the general inventive concept may also be achieved by providing a distributed printing method including accessing a host device, displaying a user interface (UI) screen, selecting two or more of the plurality of image forming apparatuses from the user interface screen which to distribute printing jobs, and generating workflow by combining a distributed printing setup of the selected image forming apparatuses to distribute the respective printing jobs by distributing a total number of print jobs among the selected image forming apparatuses such that a number of printing jobs distributed to each of the selected image forming apparatuses differ from each other by no more than one print job.

The foregoing and/or other aspects and utilities of the general inventive concept may also be achieved by providing a computer-readable recording medium having embodied thereon a computer program to execute a method, wherein the method includes accessing a host device, displaying a user interface (UI) screen, selecting two or more of the plurality of image forming apparatuses from the user interface screen which to distribute printing jobs, and generating workflow by combining a distributed printing setup of the selected image forming apparatuses to distribute the respective printing jobs by distributing a total number of print jobs among the selected image forming apparatuses such that a number of printing jobs distributed to each of the selected image forming apparatuses differ from each other by no more than one print job.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings of which:

FIGS. 7 and 8 depict an execution result using a distributed printing plug-in stored to the workflow storage;

DETAILED DESCRIPTION OF THE PREFERRED EMBODIMENTS

Figure 1:
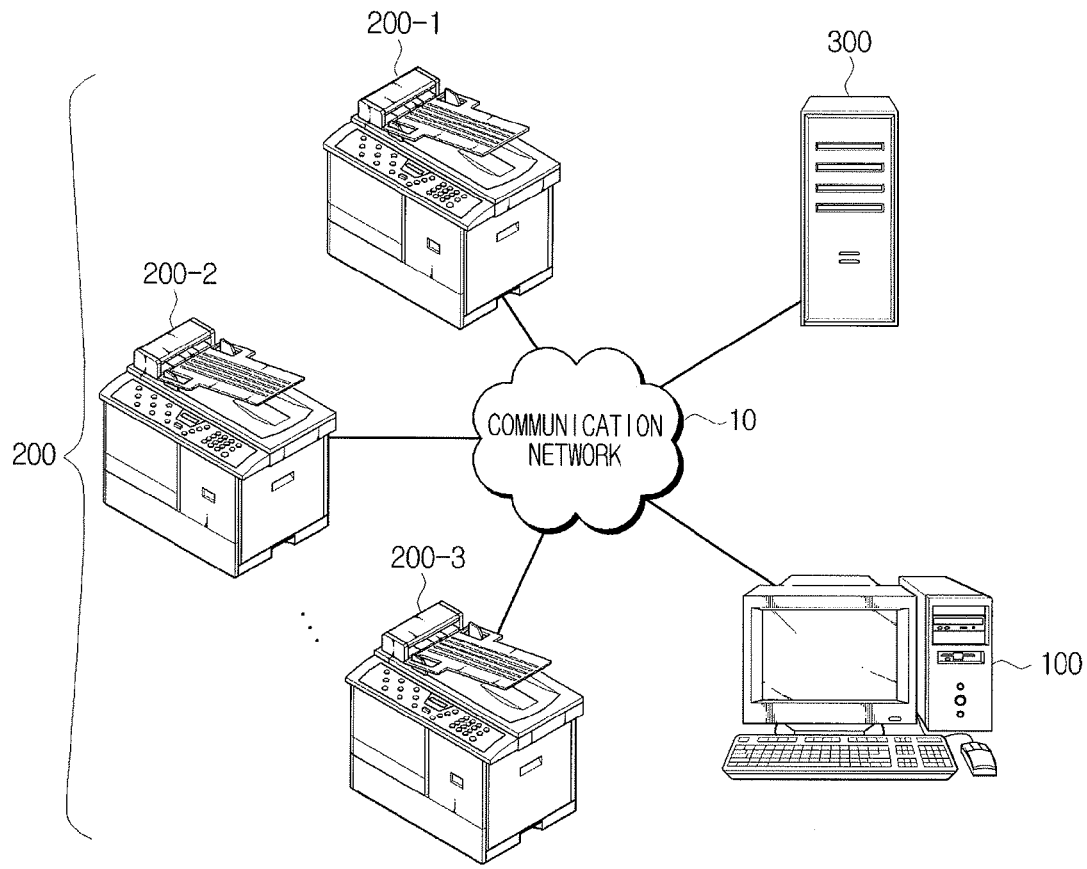
FIG. 1 is a diagram illustrating an image forming system for the distributed printing according to an exemplary embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 depicts an image forming system for the distributed printing according to an exemplary embodiment of the present general inventive concept.

The image forming system for the distributed printing in FIG. 1 includes a user terminal 100, multiple image forming apparatuses 200, and a host device 300. While a plurality of user terminals 100 can be connected, only one is illustrated to ease the understanding.

The user terminal 100 is a device such as personal computer, personal digital assistant (PDA), and laptop. A user can access the host device 300 using a web browser installed to the user terminal 100, log in to the host device 300, and generate or edit a workflow using a web user interface (UI) screen.

The workflow is provided by the host device 300 to execute various jobs using diverse functions of the image forming apparatus 200. The workflow includes all information required for the job execution. For example, the workflow includes information of a designated apparatus, an order of job processing, and a job condition. Using the stored workflows, the user merely selects one of the predefined workflows to automatically execute the selected workflow, without having to set the job condition one by one for every printing job using the image forming apparatuses 200.

The image forming apparatus 200 is a device with a program installed to communicate with the host device 300. The image forming apparatus 200 can employ various devices such as multifunction printers 200-1, 200-2, and 200-3, printers (not illustrated), fax machines (not illustrated), scanners (not illustrated), and copiers (not illustrated).

When receiving the workflow selected by the user from the host device 300, the image forming apparatuses 200 execute the job based on the received workflow. If the workflow requested by the user by accessing the host device 300 through the first multifunction printer 200-1 is 'Scan to Printer (Multiple)' job to direct scanning the document, and distributing and printing ten copies using two multifunction printers 200-1 and 200-2, the first multifunction printer 200-1 sends digital data of the scanned document to the multifunction printer 200-2 and then the two multifunction printers 200-1 and 200-2 print the scanned digital data by five copies or by the distributed copies according to the distributed printing.

The host device 300 stores log-on information (ID and password) of the user, which is pre-registered for access the host device 300, and stores the multiple workflows set for the users. The host device 300 serves as a server to provide the document management system for the workflow generation.

The host device 300 enables an authenticated user to set or edit the workflows using the document management system. When the user selects a workflow on the UI screen provided by the host device 300, the host device 300 controls displaying the selected workflow in the UI screen. Particularly, the host device 300 can provide the workflow allowing the distributed printing. The distributed printing is to print the document to be printed at the multiple multifunction printers (e.g., 200-1, 200-2, and 200-3) by distributing a number of copies, rather than at a single multifunction printer (e.g., 200-1).

A communication network 10 can be implemented using a cable connected to a general parallel port, a cable connected to a USB port, Internet using hub and LAN, or wireless network.

Figure 2:
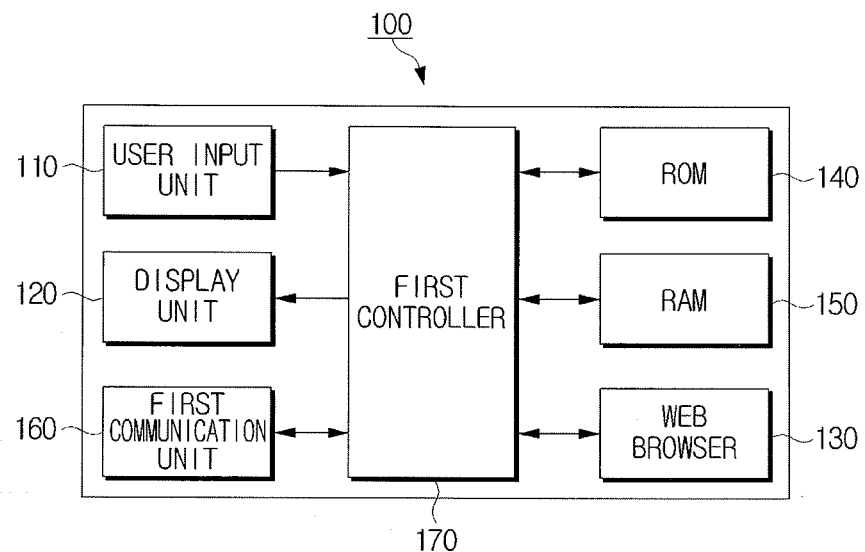
FIG. 2 is a block diagram illustrating an embodiment of a user terminal of FIG. 1.

FIG. 2 is a block diagram illustrating an embodiment of the user terminal of FIG. 1.

Referring to FIGS. 1 and 2, the user terminal 100 connected to the host device 300 includes a user input unit 110, a display unit 120, a web browser 130, a read only memory (ROM) 140, a random access memory (RAM) 150, a first communication unit 160, and a first controller 170.

The user input unit 110 is an interface like a keyboard or a mouse. By logging on to the host device 300 through the user input unit 110, the user generates or edits the workflow related to the job provided by the image forming apparatuses 200.

The display unit 120 displays UI screens for the workflow generation provided by the host device 300.

The web browser 130 processes the UI screens provided by the host device 300 to be displayable. An example of the web browser 130 is Internet Explorer. When the user activates the web browser 130 by manipulating the user input unit 110 and inputs the web route of the host device 300, the first communication unit 140 attempts to access the host device 300 corresponding to the web route. Upon accessing the host device 300, the user passes through the user authentication by logging in. Next, the user generates his/her intended distributed printing workflow or edits the pre-generated distributed printing workflow on the UI screens provided by the host device 300.

The ROM 140 contains control programs required to realize functions of the user terminal 100. The RAM 150 contains data generated in the operation of the user terminal 100.

For example, the ROM 140 contains Windows operating system to drive the user terminal 100, and a program such as Internet Explorer to drive the web browser 130. The RAM 150 contains data of UI screens to be browsed by the web browser 130. The data of the UI screens generates the workflow received from the host device 300, and includes images and texts.

The first communication unit 160 sends an access signal corresponding to the web route input in the UI screen, to the host device 300, and receives a plurality of UI screens from the host device 300.

The first controller 170 controls operations of the user terminal 100 using control programs. When the user input unit 110 requests to activate the web browser 130, the first controller 170 controls displaying an initial UI screen in the display unit 120 by activating the web browser 130. When the user input unit 110 inputs the web route of the host device 300, the first controller 170 controls the first communication unit 160, the web browser 130, and the display unit 120 to access the host device 300, receive the UI screens corresponding to the web route from the host device 300, and display the received UI screens.

Figure 3:
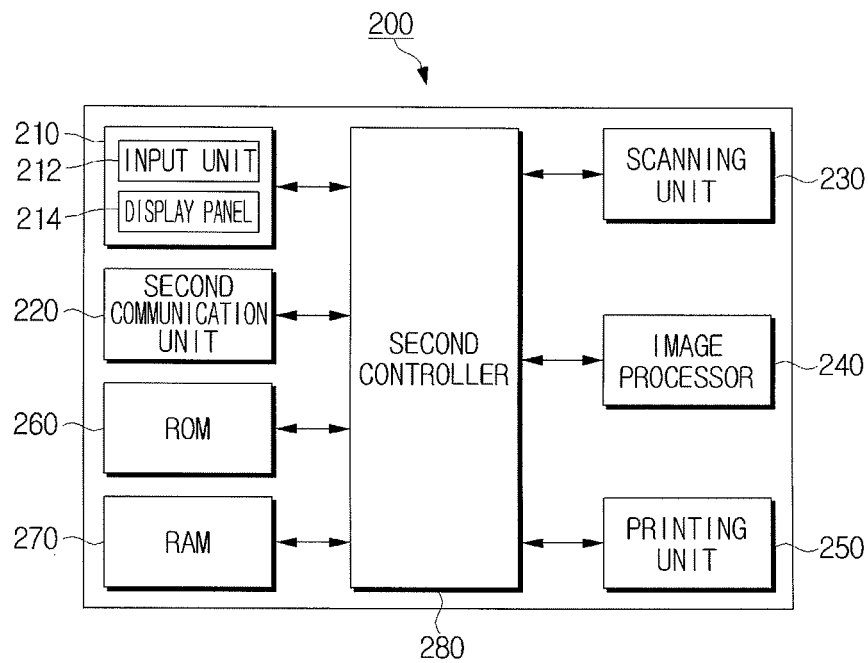
FIG. 3 is a block diagram illustrating an embodiment of an image forming apparatus of FIG. 1.

FIG. 3 is a block diagram illustrating an embodiment of the image forming apparatus of FIG. 1.

Referring to FIGS. 1 and 3, the image forming apparatuses 200, that is, the first, second, and third multifunction printers 200-1, 200-2, and 200-3 include an operation panel unit 210, a second communication unit 220, a scanning unit 230, an image processor 240, a printing unit 250, a ROM 260, a RAM 270, and a second controller 280. While the first multifunction printer 200-1 of the image forming apparatuses 200 is illustrated by way of example, any printing device connected to the communication network 100 can be adopted.

The operation panel unit 210 includes an input unit 212 and a display panel 214. When the user logs on to the host device 300 by manipulating the input unit 212, the display panel 214 displays a workflow list set for the first multifunction printer 200-1 received from the host device 300.

The second communication unit 220 communicates with the user terminal 100, the host device 300, and the other image forming apparatuses 200 over the communication network 10.

The scanning unit 230 optically scans the placed image and converts the scanned data to digital data.

The image processor 240 converts a file requested to print to printable data.

The printing unit 250 prints printable data converted at the image processor 240 on printing media with a color or mono format.

The ROM 260 contains control programs and firmware for the operations of the first multifunction printer 200-1. The RAM 270 contains data generated in the operation of the image forming apparatus 200.

The second controller 280 controls the operations of the first multifunction printer 200-1 according to the programs stored to the ROM 280. For instance, when the input unit 212 requests the communication connection to the host device 300, the second controller 280 controls the second communication unit 220 to maintain the communication with the host device 300. When the user logs on to the UI screens provided by the host device 300 through the user authentication, the second controller 280 controls receiving the workflow list corresponding to the logging-on user from the host device 300 and to display the workflow list in the display panel 214.

When one workflow is selected from the displayed workflow list, the second controller 280 processes executing the job corresponding to the selected workflow. For instance, when 'Scan to printer' is selected from the workflow list, the second controller 280 controls the scanning unit 230 and the printing unit 250 to scan and print the placed document.

When 'Scan to printer (Multiple),' indicative of the distributed printing is selected in the workflow list, the second controller 280 confirms the image forming apparatuses corresponding to 'Scan to printer (Multiple)'. When the image forming apparatuses corresponding to 'Scan to printer (Multiple)' are the first and second multifunction printers 200-1 and 200-2 and the user logs on through the first multifunction printer 200-1, the first multifunction printer 200-1 scans the placed document and controls the communication interface 310 to send the scanning data to the other image forming apparatus (e.g., 200-2) of 'Scan to printer (Multiple)'.

When the image forming apparatuses corresponding to 'Scan to printer (Multiple)' are the first and second multifunction printers 200-1 and 200-2 and the user logs in through the third multifunction printer 200-3, the third multifunction printer 200-3 sends to the first and second multifunction printers 200-1 and 200-2 a signal directing to execute the job corresponding to the selected workflow 'Scan to printer (Multiple)'. When the data to be scanned is placed on the first multifunction printer 200-1, the first multifunction printer 200-1 scans the document and sends the scanning data to the other image forming apparatus (e.g., 200-2) of 'Scan to printer (Multiple)', and the first and second multifunction printers 200-1 and 200-2 print the scanning data by the distributed copies.

The second controller 280 controls the printing unit 250 to print the scanning data by the copies distributed to the first multifunction printer 200-1. The second multifunction printer 200-2 also prints the scanning data by respective distributed copies as stored in the workflow 'Scan to printer (Multiple)'. Hence, the first and second multifunction printers 200-1 and 200-2 print the same scanning data by the distributed copies of the total copies.

After printing the distributed copies, the second controller 280 can display a result of the distributed printing, that is, success or failure of the distributed printing in the display panel 214 by receiving the UI screens of FIG. 8 from the host device 300. Upon confirming the failure of the distributed printing, the user can request to re-print the failed copies by manipulating the input unit 212. Alternatively, the second controller 280 can receive an event indicating the failure of the distributed printing from the host device 300 and control the printing unit 250 to re-print the file by the failed copies.

Figure 4:
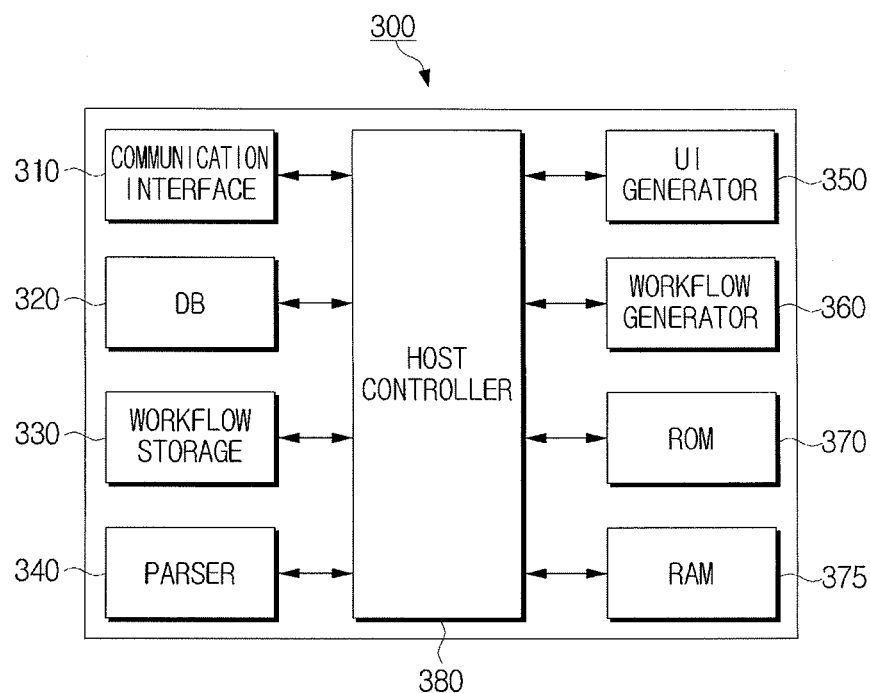
FIG. 4 is a block diagram illustrating an embodiment of a host device of FIG. 1.

FIG. 4 is a block diagram illustrating an embodiment of the host device of FIG. 1.

The host device 300 of FIG. 4 includes a communication interface 310, a database (DB) 320, a workflow storage 330, a parser 340, a UI generator 350, a workflow generator 360, a ROM 370, a RAM 375, and a host controller 380.

The host device 300, which is the server to provide the UI screens to generate the workflows, contains information of the image forming apparatuses 200 connected over the communication network and IDs and passwords of the users.

The communication interface 310 is communicatively connected to the user terminal 100 and the image forming apparatuses 200 over the communication network 10. The communication interface 310 receives the user's ID and password from the user terminal 100 or the image forming apparatuses 200 and provides the ID and password to the host controller 240. The communication interface 310 sends the UI screens to generate a new workflow or the UI screens to edit the existing workflow to the user terminal 100, and sends the workflow list mapped and stored to the logging-in user and the user's selected workflow of the workflow list to the image forming apparatuses 200.

The DB 320 contains the information of the image forming apparatuses 200 connected over the communication network 10 and the IDs and the passwords of the users, and property values of each property supported by the image forming apparatuses 200. For example, the DB 320 contains the property values 'Landscape' and 'Portrait' for the property 'paper direction' of the image forming apparatuses 200.

The DB 320 contains initial UI screen data for the log-in, UI screen data for the UI screen generation relating to the workflows, text data, and images such as a virtual key or the like, for example, .▼. The images are stored in a plug-in manner.

Figure 5A:
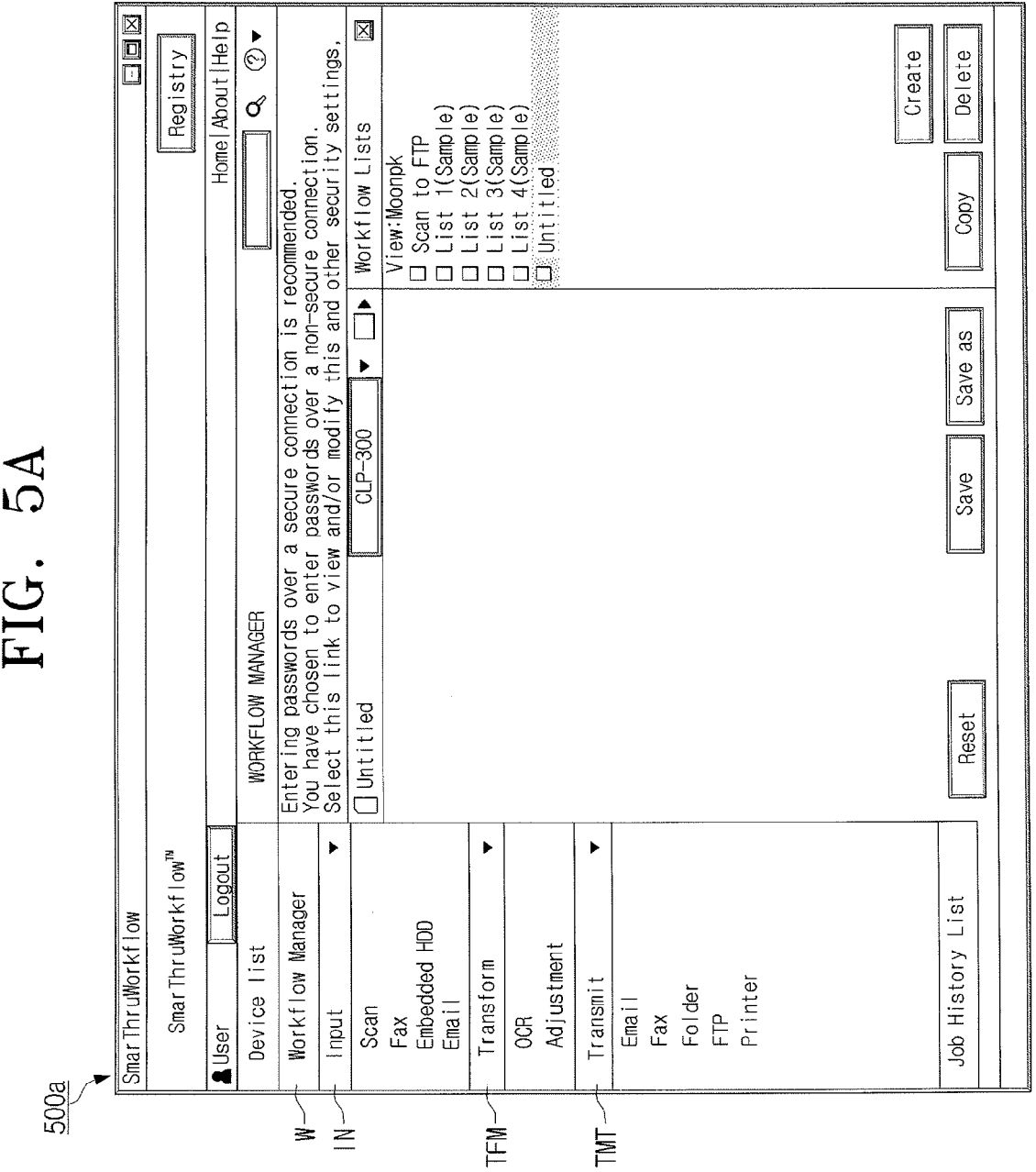
FIGS. 5A and 5B depict a new workflow generation on a workflow UI screen displayed in a display unit of FIG. 3.
Figure 5B:
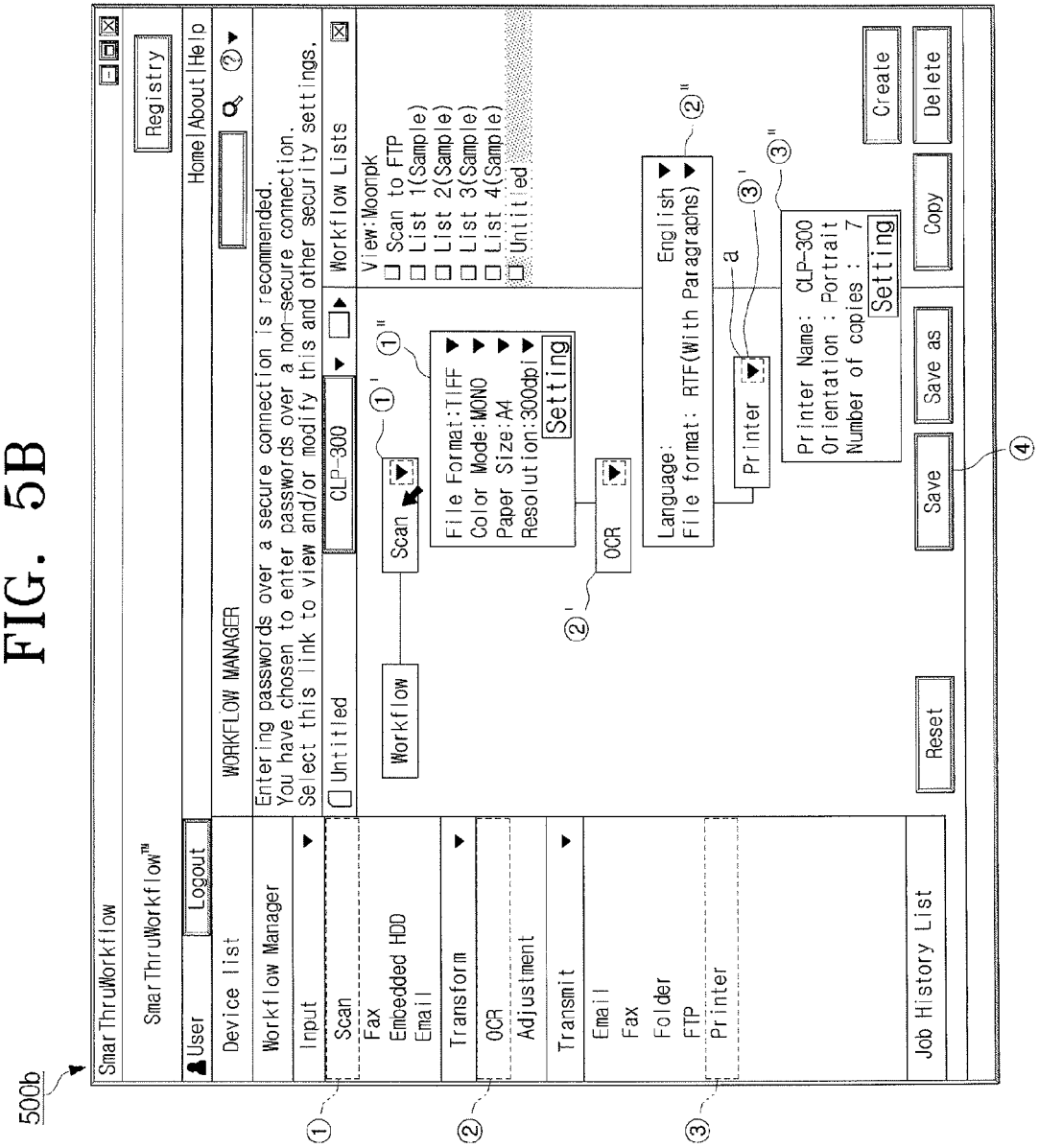

The workflow storage 330 stores the workflow document of FIG. 5B generated for the user in the UI screen according to the users. The workflow stored to the workflow storage 330 is used to illustrate the workflow pre-generated by the user to the user logging on to the host device 300. The workflow edited or added by the user is stored to the workflow storage 330.

When the workflow having the distributed printing function is generated by the distributed printing setup, the workflow storage 330 maps and stores the workflow including the distributed copies generated at the workflow generator 360 to the image forming apparatuses (e.g., 200-1 and 200-2) distributed the print copies and/or the log-in users.

When the user terminal 100 accesses the host device 300, the parser 340 parses the initial UI screen data for the log-in. When the user terminal 100 requests to display the UI screen for the workflow generation, the parser 340 parses the UI screen data stored to the DB 320. When the display of the pre-generated workflow is requested, the parser 340 parses the workflow document stored to the workflow storage 330.

The UI generator 350 generates the initial UI screen (not illustrated), and the workflow UI screens of FIGS. 5A, 5B, and 6A through 6I to generate or edit the workflows related to the image forming apparatuses 200. The UI generator 350 generates the UI screen by the program to drive the document management system. The operations to generate and edit the workflows are performed using the UI screens. The generated UI screens are transmitted to the user terminal 100 currently used by the user.

FIGS. 5A, 5B, and 6A through 6I depict the generation of a new workflow in the workflow screens displayed in the display unit of FIG. 3.

When the user is authenticated in the initial UI screen, the UI generator 350 generates the basic UI screen 500a to generate the workflow as illustrated in FIG. 5A. The parser 340 receives and parses an XML document corresponding to the basic UI screen 500a from the DB 320. The UI generator 350 generates the basic UI screen 500a of FIG. 5A by combining the images to generate the basic UI screen 500 stored to the DB 320 with the parsing result.

In FIG. 5A, the basic UI screen 500a displays menus including Device List, Workflow Manager (W), Input (IN), Transform (TFM), and Transmit (TMT).

The Device List is the menu to request displaying a list of the image forming apparatus. The Workflow Manager (W) is the menu to request generating and/or editing the workflows. The Input (IN) displays the sources to provide the data to be used for the workflows, the Transform (TFM) displays the specific methods to process the data to be used for the workflows, and the Transmit (TMT) displays destinations of the processed data. The image forming apparatuses 200 illustrated in the Device List may be the image forming apparatuses registered to the host device 300, or the host controller 380 may search and display the image forming apparatuses 200 connected to the communication network 10.

For example, the Input (IN) displays Scan to scan and process the image, Fax to process the fax data, and Email to process the e-mail. The Transform (TFM) displays OCR for OCR-processing the data selected at the Input (IN) and Adjustment to convert the selected data to a designated file. The Transform (TFM) displays sub-menus including Email to send data to the recipient's e-mail, Folder to store data to a preset folder of the user terminal 100, the image forming apparatuses 200, or the host device 300, and Printer to print the data at the image forming apparatuses.

When the user selects an optical character recognition (OCR) function, the image forming apparatus 200 or the host device 300 can extract text from the scanned image.

In the basic UI screen 500a displayed in the user terminal 100, after generation of the new workflow is requested from the user input unit 110, when one sub-menu (e.g., 'Scan') of the Input (IN), one sub-menu (e.g., 'OCR') of the Transform (TFM), and one sub-menu (e.g., 'Printer') of the Transmit (TMT) are selected, the UI generator 350 generates a UI screen 500b of FIG. 5B using the UI screen data stored to the DB 320.

In FIG. 5B, the UI generator 350 generates the UI screen 500b to display the parent menu 'Scan ▼' plug-in ①' corresponding to the selected 'Scan' ①, the sub-menu plug-in ①" of 'Scan' ①, the parent menu 'OCR ▼' plug-in ②' corresponding to the selected 'OCR' ②, the sub-menu plug-in ②" of 'OCR' ②, the parent menu 'Printer' plug-in ③' corresponding to the selected 'Printer' ③, and the sub-menu plug-in ③" of 'Printer' ③.

When the user input unit 110 receives the selection signal of '▼' of the properties of the sub-menu plug-ins ①", ②", and ③", the UI generator 350 generates a UI screen (not illustrated) illustrating supportable property values of the image forming apparatus 200 for each property. The user can select or modify an intended property value through the user input unit 110.

Meanwhile, the UI generator 350 can generate a UI screen enabling not only the first multifunction printer 200-1 but also another image forming apparatus (e.g., 200-2) to perform the distributed printing. The workflow generated in the UI screen 500b of FIG. 5B directs to print seven copies of the scanned document using only one image forming apparatus, for example, using only the first multifunction printer 200-1 named 'CLP-300'. The user may generate a distributed printing workflow to print the seven copies of the scanned document using the multiple image forming apparatuses 200.

Now, the generation of the workflow for the distributed printing is described by referring to FIGS. 6A through 6I. Note that FIGS. 6A through 6I merely depict the Printer plug-in ③' and the sub-menu plug-in ③" of Printer ③ in the UI screen of FIG. 5B. The other items are omitted to ease the understanding.

After the UI screen of FIG. 5B is displayed, the user can select ▼ (a) to change to the distributed printing. When ▼ (a) is selected, the UI generator 350 generates a UI screen illustrating 'Distributed printing (b) and Delete' menu as illustrated in FIG. 6A.

Figure 6A:
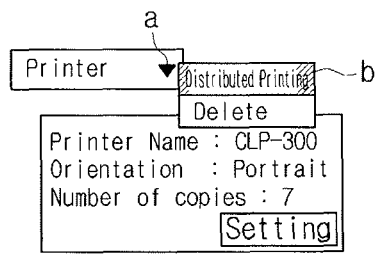
FIGS. 6A through 6I depict the workflow generation for the distributed printing on the workflow UI screen displayed in the display unit of FIG. 3.
Figure 6B:
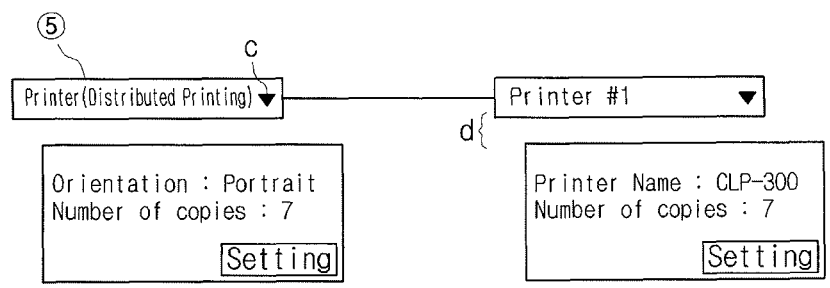

When the user selects 'Distributed printing (b)', the UI generator 350 generates a UI screen to change Printer plug-in ③' to Printer (Distributed Printing) plug-in ⑤ as illustrated in FIG. 6B and changes the designated default printer (CLP-300) of FIG. 6A to Printer #1 (d). Herein, the default printer (CLP-300), that is, the image forming apparatus corresponding to Printer #1 can be the first multifunction printer 200-1 by way of example. Printer (Distributed Printing) plug-in ⑤ is to set the distributed printing using the multiple image forming apparatuses 200.

Figure 6C:
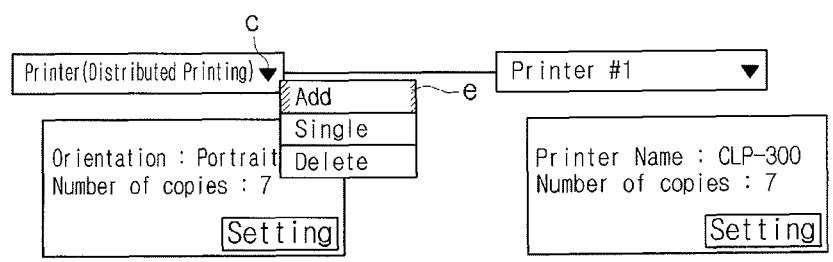
Figure 6D:
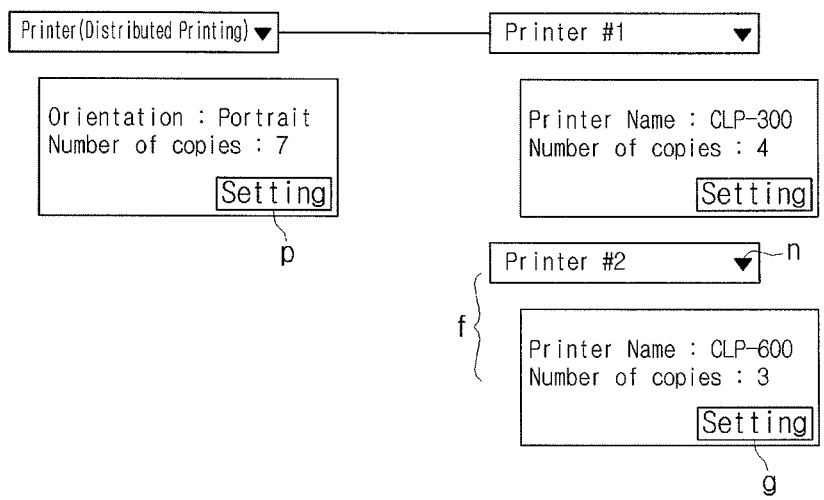

To add another image forming apparatus for the distribute printing, the user can select ▼ (c) in Printer (Distributed Printing) plug-in ⑤ of FIG. 6B. When ▼ (c) is selected, the UI generator 350 generates a UI screen illustrating 'Add (e), Single, and Delete' menu as illustrated in FIG. 6C. When the user select 'Add (e)' menu, the UI generator 350 generates a UI screen including Printer #2 (f) as illustrated in FIG. 6D. The image forming apparatus (CLP-600) corresponding to Printer #2 can be the second multifunction printer 200-2 by way of example.

The total number of copies is automatically distributed to Printer #1 plug-in and Printer #2 plug-in in equal number. In FIG. 6D, for example, the total number of copies is seven, which is distributed to four copies and three copies. The total number of copies seven may be distributed to 3 and 4. The total number of copies for the distributed printing is distributed by the workflow generator 360 using the document management program, to be explained.

To add yet another image forming apparatus (e.g., 200-3), the user can select ▼ (c) and 'Add (e)' in FIG. 6C in order. At this time, the total number of copies is equally distributed to three image forming apparatuses 200-1, 200-2, and 200-3.

After the UI screen of FIG. 6D is displayed, the user can change the image forming apparatuses for the distributed printing using 'Setting (g)' menu. When the user selects 'Setting (g)', the UI generator 350 pops up 'Printer #2 setup' screen in the UI screen as illustrated in FIG. 6E.

Figure 6E:
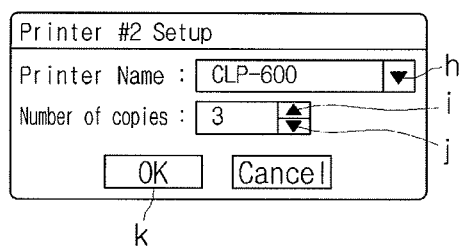

When the user selects ▼ (h) corresponding to Printer Name in the UI screen of FIG. 6E, the UI generator 350 enumerates the names of other image forming apparatuses which are registered to the DB 320 or connected to the communication network 10. Accordingly, the user can select one of the enumerated image forming apparatuses. Also, the user can increase or decrease the number of copies by manipulating '▲ (i)' and '▼ (j)' corresponding to the number of copies. When the number of copies for Printer #2 is changed using '▲ (i)' and '▼ (j)' and then OK (k) is selected, the total number of copies is also changed from seven to the corresponding number.

Figure 6F:
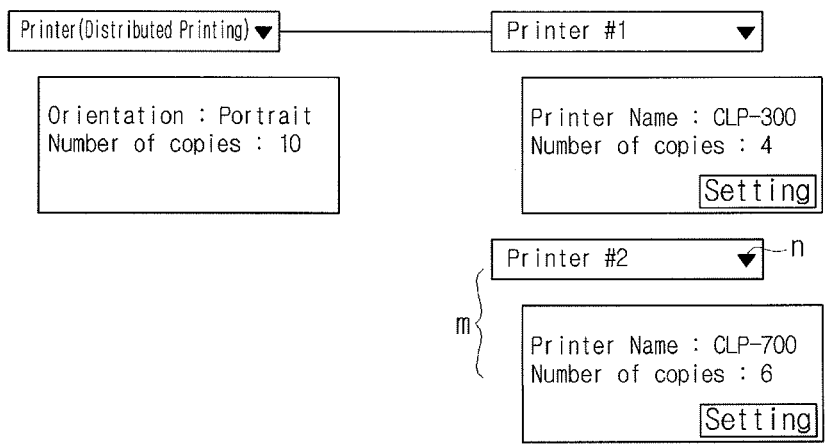

FIG. 6F illustrates a case (m) where the image forming apparatus corresponding to Printer #2 is changed to CLP-700, for example, to the third multifunction printer 200-3, the number of copies of CLP-700 (200-3) is changed from three to six, and the total number of copies is changed from seven to ten.

Figure 6G:
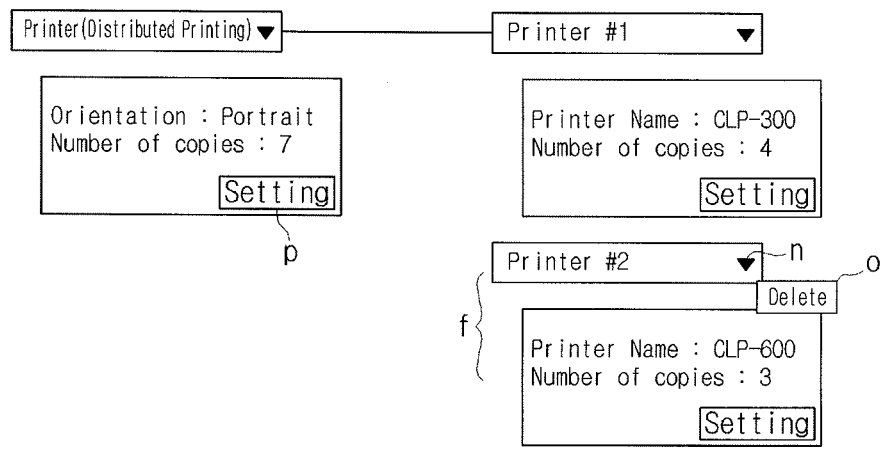

FIG. 6G illustrates a deletion of the added Printer #2. In FIG. 6G, when the user selects ▼ (n) in Printer #2 plug-in, the UI generator 350 generates a UI screen illustrating 'Delete (o)' menu. When 'Delete (o)' is selected, the UI generator 350 generates and displays a UI screen of FIG. 6A or 6B in the user terminal 100.

Figure 6H:
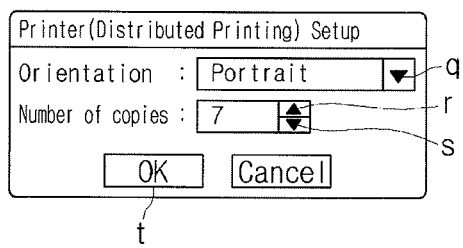
Figure 6I:
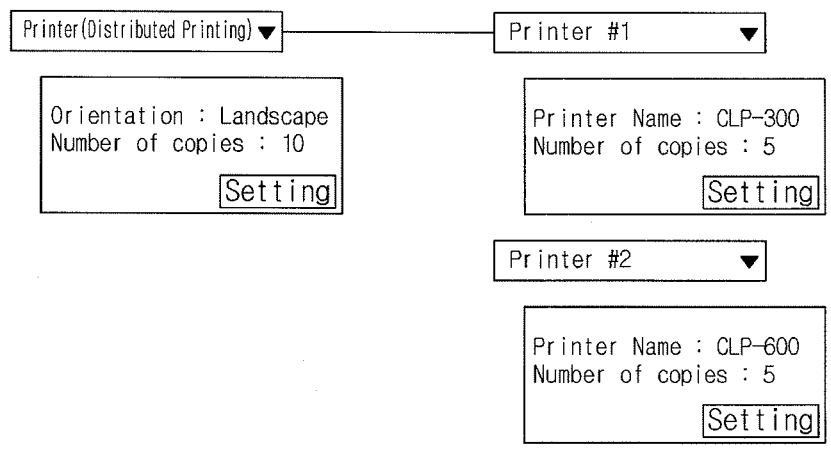

FIG. 6H illustrates a change of the printing properties by selecting 'Setting (p)' in the UI screen of FIG. 6D. When 'Setting (p)' is selected, the UI generator 350 generates a UI screen including '▼ (q)', '▲ (r)', and '▼ (s)' which enable to change the orientation and the total number of copies.

When the user changes the orientation and the total number of copies by manipulating '▼ (q)', '▲ (r)', and '▼ (s)' and selects OK (t), the UI generator 350 generates a UI screen to change the orientation from the portrait to the landscape, changes the total number of copies from seven to ten, and automatically distributes the total number of copies 10 to Printer #1 plug-in and Printer #2 plug-in in the equal number five. Comparing FIG. 6F with FIG. 6I, the total number of copies is the same, whereas the numbers of copies distributed to Printer #1 plug-in and Printer #2 plug-in are different from each other.

After the UI screen of FIG. 5B, 6D, 6F or 6I is displayed, when 'Save' ④ is selected at the user input unit 110, the UI generator 350 generates a window (not illustrated) to input a name of the generated workflow over the workflow UI screen. When the user inputs the name of the workflow by manipulating the user input unit 110, the first communication unit 160 sends the set property values and the input name to the third communication unit 310.

The workflow generator 360 generates a new workflow for the image forming apparatuses 200 using the property values of each property and the workflow name received from the first communication unit 160.

Particularly, when the distributed printing setup of the file to be printed is requested in the UI screen of FIG. 5B generated at the UI generator 350, the workflow generator 360 generates a workflow by combining the multifunction printers 200-1 and 2002 to distribute the printing job to the multifunction printers 200-1 and 200-2 of the image forming apparatuses 200. The generated workflow is given a name. The workflow generator 360 can generate the workflow using a web language such as XML format, but not limited to this language.

After the UI screen of FIG. 5B is displayed, the distributed printing setup is requested, and the multifunction printers 200-1 and 200-2 are selected as illustrated in FIGS. 6A through 6D, the workflow generator 360 distributes the total number of copies (e.g., seven) set for the file to be printed to the selected multifunction printers 200-1 and 200-2 as illustrated in FIG. 6D. In doing so, the workflow generator 360 generates a workflow including the numbers of copies distributed to the multifunction printers 200-1 and 200-2.

The workflow generator 360 equally distributes the total number of copies to the selected image forming apparatuses 200-1 and 200-2 according to a preset rule. For instance, when the total number of copies is odd, the rule distributes one more copy to one (e.g., 200-1) of the selected image forming apparatuses 200-1 and 200-2. Alternatively, the rule divides the total number of copies by the number of the selected image forming apparatuses 200-1 and 200-2 and distributes the equal number of copies to the image forming apparatuses 200-1 and 200-2. When there is a remainder after the division, the rule distributes one more copy to the image forming apparatuses from the highest image forming apparatus.

When the number of copies distributed to one of the selected multifunction printers 200-1 and 200-2 increases or decreases as illustrated in FIG. 6E, the workflow generator 360 changes the total number of copies by reflecting the increase or the decrease and generates a workflow with the changed total number of copies.

The workflow storage 330 maps and stores the generated new workflow to the log-on user. When 'Save' ④ is selected in the UI screen of FIG. 5B, the workflow is stored with the distributed printing function unset. When 'Save' ④ is selected in the UI screen of FIG. 6D, 6F, or 6I, the workflow is stored with the distributed printing function set. That is, the workflow using the distributed printing plug-in is stored to the workflow storage 330.

The distributed printing is applicable not only to the workflow like 'Scan to Printer' but also any printing workflow like 'Email to Printer', 'Fax to Printer', and 'Folder to Printer'.

FIG. 7 depicts an execution result using the distributed printing plug-in stored to the workflow storage.

In FIG. 7, the user can confirm the execution result using the workflow with the distributed printing plug-in set by logging in to the host device 300. When 'Job History List' menu is selected in the UI screen, the UI generator 350 generates a UI screen illustrating 'Job History List' as illustrated in FIG. 7. For instance, when the name of the workflow using the distributed printing plug-in is 'SCAN-PRINTER (MULTIPLE)' or when one or more printing jobs fail, a result of 'SCAN-PRINTER (MULTIPLE)' displays 'Fail'.

'Job History List' briefly illustrates the execution result of the distributed printing plug-in. When one job history 710 is checked, the UI generator 350 generates a UI screen illustrating detailed properties corresponding to the selected job history as illustrated in FIG. 8. As one can see from FIG. 8, the first multifunction printer 200-1 corresponding to 'Printer #1' succeeds in the distributed printing, whereas the second multifunction printer 200-2 corresponding to 'Printer #2' fails the distributed printing.

The ROM 370 contains control programs to realize the functions of the host device 300, a management program to manage the image forming apparatuses 200, a document management system program to generate the workflow, software for the plug-in, a program to distribute the total number of copies, a program to parse the XML workflow, and software to generate the UI screen. The RAM 375 contains data generated in operations of the host device 300.

The host controller 380 controls the operations of the host device 300 using the pre-stored control programs. When the user logs on to the UI screen provided by the host device 300 through the user terminal 100, the image forming apparatuses 200, or the host device 300, the host device 300 authenticates the user using the registered user information.

When the user authentication succeeds at the user terminal 100, the host controller 380 provides the workflows mapped and stored for the user to the user terminal 100. Also, when the user logs on to the UI screen provided by the host device 300 through the image forming apparatuses 200, the host device 300 provides the workflows mapped and stored for the user to the image forming apparatus 200-1.

The host controller 380 controls the workflow storage 330 to map and store the generated workflow to the multifunction printers 200-1 and 200-2 and the log-on user.

Figure 9:
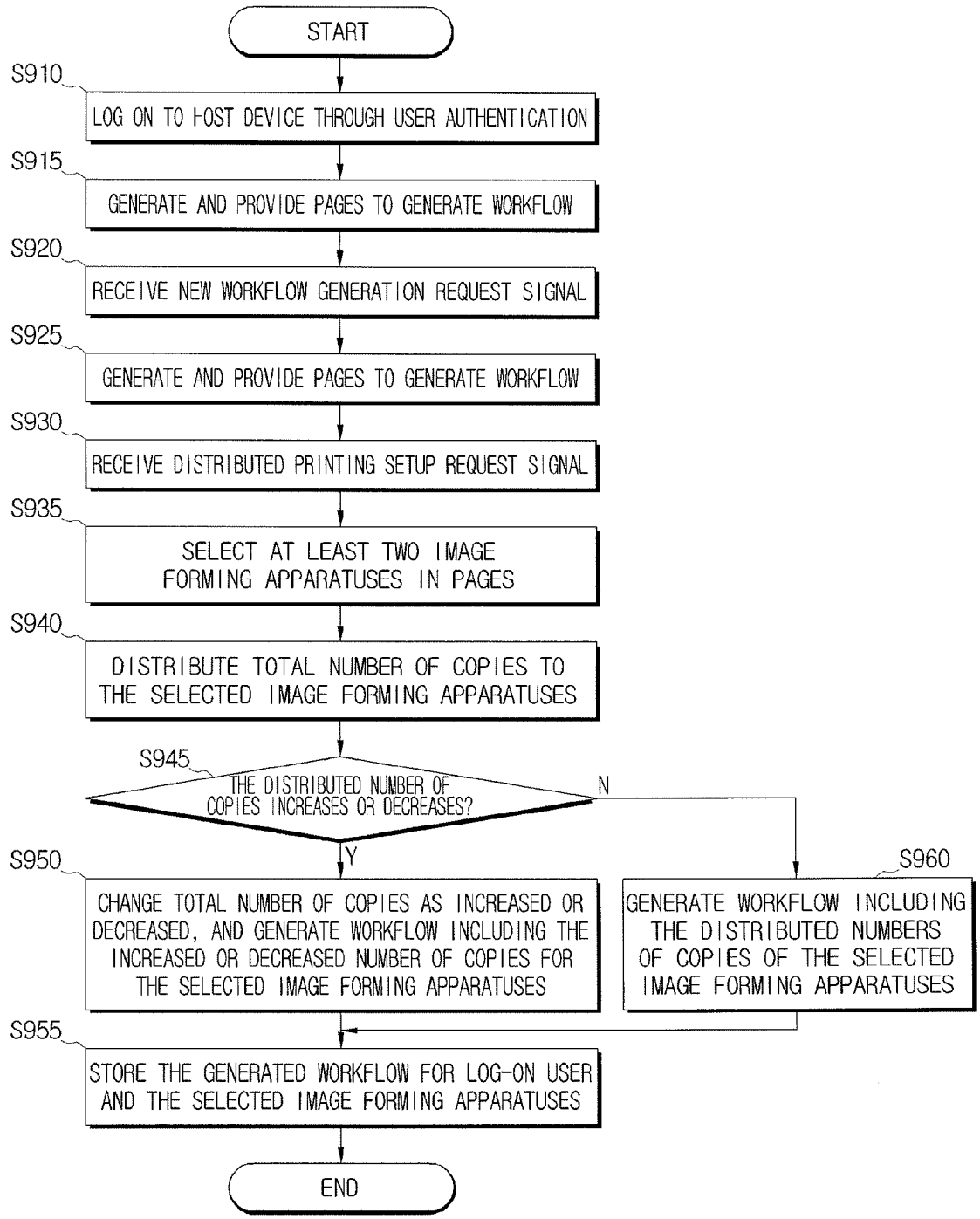
FIG. 9 is a flowchart illustrating a distributed printing setup method of the host device of FIG. 1.

FIG. 9 is a flowchart outlining a distributed printing setup method of the host device of FIG. 1. Hereafter, descriptions explain a case where the user accesses the host device 300 through the user terminal 100 and then generates a workflow for the distributed printing.

Referring to FIGS. 1 through 9, when the user logs on to the host device 300 through the user terminal 100 and is authenticated (operation S910), the UI generator 350 generates and provides a UI screen for the workflow generation to the user terminal 100 (operation S915).

The UI screen is displayed in the display unit 120 by the web browser 130 of the user terminal 100. When a signal requesting the new workflow generation is received from the user terminal 100 (operation S920), UI screens of FIGS. 5A and 5B for the workflow generation are generated and transmitted to the user terminal 100 (operation S925).

Next, upon receiving a signal requesting the setup of the distributed printing in the UI screen of FIG. 6A (operation S930), the UI generator 350 generates and sends the UI screen of FIG. 6B to the user terminal 100.

When the user terminal 100 selects multiple image forming apparatuses (e.g., 200-1 and 200-2) in the UI screens of FIGS. 6B, 6C, and 6D (operation S935), the workflow generator 360 distributes the total number of copies to the selected image forming apparatuses (e.g., 200-1 and 200-2) (operation S940).

When the number of copies allotted to the image forming apparatus (e.g., 200-2) increases or decreases in the UI screen of FIG. 6E (operation S945), the workflow generator 360 modifies the total number of copies as increased or decreased and generates workflows including the increased or decreased number of copies with respect to the selected image forming apparatuses (e.g., 200-1 and 200-2) (operation S950).

Next, the workflow storage 330 maps and stores the generated workflows according to the log-on user and/or the selected image forming apparatuses (e.g., 200-1 and 200-2) (operation S955).

By contrast, when the number of copies does not increase or decrease in S945, the workflow generator 360 generates a workflow including the distributed copies in operation S940 (operation S960). The generated workflow is stored to the workflow storage 330 (operation S955).

When the user accesses to the host device 300 and passes through the user authentication using one (e.g. 200-1) of the image forming apparatuses 200, the host device 300 sends the workflow list including the workflow stored in operation S955 to the first multifunction printer 200-1. At this time, the host device 300 can send the workflow list mapped and stored for the log-on user, or the workflow list mapped stored for both of the user and the first multifunction printer 200-1. The workflow list is displayed in the display panel 214 of the first multifunction printer 200-1. When one workflow is selected in the workflow list, the image forming apparatuses belonging to the selected workflow perform the distributed printing job corresponding to the selected workflow.

Figure 10:
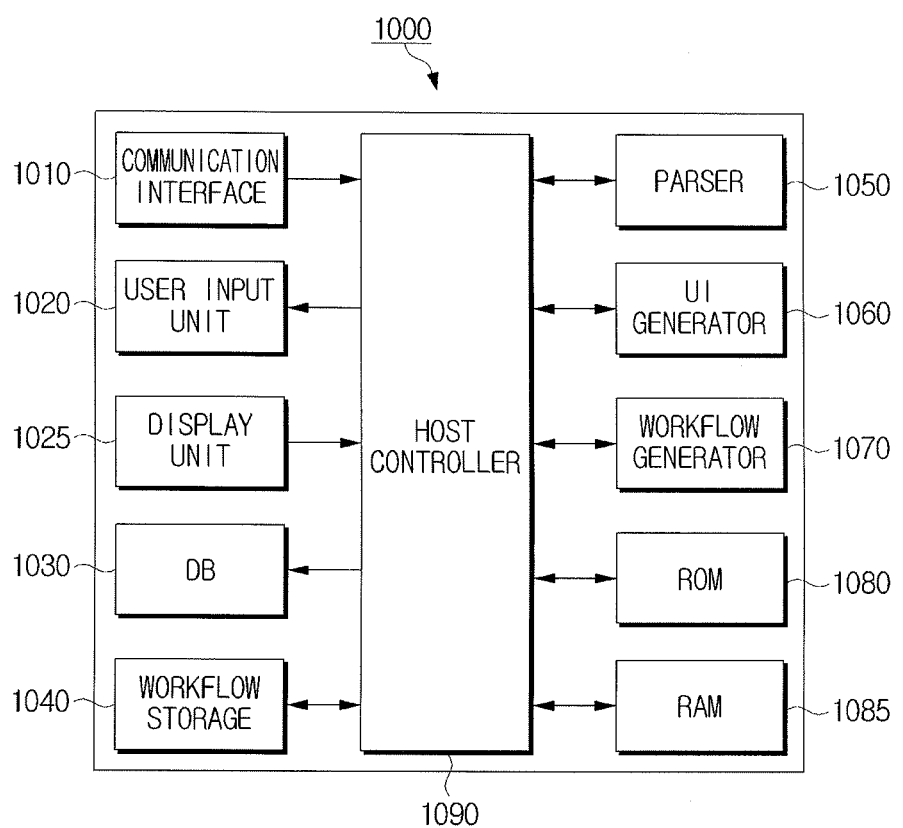
FIG. 10 is a block diagram illustrating a host device according to another exemplary embodiment of the present general inventive concept.

FIG. 10 is a block diagram illustrating a host device according to another exemplary embodiment of the present general inventive concept.

The host device 1000 of FIG. 10 includes a communication interface 1010, a user input unit 1020, a display unit 1025, a DB 1030, a workflow storage 1040, a parser 1050, a UI generator 1060, a workflow generator 1070, a ROM 1080, a ROM 1085, and a host controller 1090. The host device 1000 is the server to store UI screens to generate workflows and the generated workflow list.

The communication interface 1010 is connected to a user terminal (not illustrated) and a plurality of image forming apparatuses (not illustrated) having the printing function over a wired or wireless communication network. The communication interface 1010 forwards user's ID and password from the image forming apparatus (not illustrated) to the host controller 1090.

The user input unit 1020 is a user interface to generate a distributed printing workflow in a UI screen provided by a document management system program. The user input unit 1020 can be implemented using a mouse or a keyboard. The display unit 1025 displays UI screens to generate workflows through the document management system program at the UI generator 1060.

The DB 1030 contains information of the image forming apparatuses (not illustrated) connected over the communication network (not illustrated) and IDs and passwords of the users, and contains property values of each property supported by the image forming apparatuses (not illustrated). The DB 1030 also contains initial UI screen data for the log on, and UI screen data required to generate UI screens for the workflows.

The user generates a workflow including the distributed printing function by manipulating the user input unit 1020. The workflow storage 1040 maps and stores the workflow including the numbers of copies distributed by the workflow generator 1070 to the corresponding image forming apparatuses (not illustrated) and the log-on user.

When the user directly accesses the document management system through the web route such as https://localhost:port at the host device 1000, the parser 1050 parses the UI screen data to generate and edit the workflows of FIGS. 5A, 5B, and 6A through 6I. For example, the parser 1050 parses the initial UI screen data for the log in. When the display of the UI screen to generate the distributed printing workflow is requested, the parser 1050 parses the UI screen data for the distributed printing workflow generation stored to the DB 1030.

The UI generator 1060 generates the initial UI screen (not illustrated) and the workflow UI screens of FIGS. 5A, 5B, and 6A through 6I to generate and edit the workflows related to the image forming apparatuses (not illustrated) from the parsing result output from the parser 1050.

When the distributed printing setup is requested in the workflow UI screens of FIGS. 5A, 5B and 6A through 6I by manipulating the user input unit 1020, the workflow generator 1070 allots the total number of copies to distribute the printing job to two or more selected image forming apparatuses (not illustrated). The workflow generator 1070 generates the distributed printing workflow for the image forming apparatuses (not illustrated) using the property values (e.g., landscape) of each property (e.g., orientation), the number of copies allotted to the selected image forming apparatus (not illustrated), and the workflow name.

The ROM 1080 contains control programs to realize the functions of the host device 1000, a document management system program to generate the distributed printing workflow, software for the plug-in, a program to parse the XML workflow, and software for the UI screen generation. The RAM 1085 contains data generated in the operations of the host device 1000.

The host controller 1090 controls an overall operation of the host device 1000 using the pre-stored control programs. When the user logs on to the UI screen provided by the host device 1000 at the host device 1000, the host device 1000 authenticates the user using the registered user information.

When the user authentication is successful, the host controller 1090 generates and displays a workflow list stored for the user in the display unit 1025. After the user authentication succeeds, when a request signal for the workflow generation is input from the user input unit 1020, the host controller 1090 controls the function blocks to generate a workflow for the distributed printing using the UI screens. The host controller 1090 controls the workflow storage 1040 to map and store the generated workflow to the selected image forming apparatuses (not illustrated) and the log-on user.

Hence, the user can generate the workflow for the distributed printing by accessing the host device 1000 through the user terminal (not illustrated) or by directly accessing the host device 1000.

When logging on to the host device 1000 through the user terminal (not illustrated) or the image forming apparatus (not illustrated) and receiving the corresponding workflow list, the user selects his/her intended distributed printing workflow in the workflow list. The image forming apparatus (not illustrated) executes the job corresponding to the workflow selected by the user. When the user selects the distributed printing workflow, the host device 1000 can directly command at least two image forming apparatuses (not illustrated) of the distributed printing to execute the distributed printing job corresponding to the selected workflow.

As set forth above, the host device for the distributed printing setup and the distributed printing setup method utilize the distributed printing workflow to direct distributing the printing job to the plurality of image forming apparatuses. Thus, time taken to print data can be reduced and a load on the single image forming apparatus can be mitigated. Particularly, since the user terminal accessible to the host device or the host device directly generates the distributed printing workflow, the user's convenience can be enhanced.

Further, the total number of copies can be changed using the distributed printing workflow. The user can easily change the image forming apparatuses selected for the distributed printing through the user interface.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A host device for a distributed printing setup, comprising:
   a user interface (UI) generator to generate a UI screen to allow a user to select a plurality of image forming apparatuses for a distributed printing;
   a workflow generator to generate, when the plurality of image forming apparatuses are selected in the generated UI screen, a workflow by combining distributed printing setup of the selected plurality of image forming apparatuses to distribute a printing job of a file to be printed, such that the workflow is mapped to the user,
   a communication unit to communicate with the image forming apparatuses over a communication network; and
   a host controller to control the communication unit to send a workflow list mapped to the user and including the workflow and other workflows mapped to the user therein to one of the selected plurality of image forming apparatuses in response to a user authentication succeeding to allow a user to select from among the workflow and the other workflows within the workflow list such that the printing job is distributedly performed among the selected plurality of image forming apparatuses,
   wherein the workflow is used for distributing a number of copies of a same file to the selected plurality of image forming apparatuses.

2. The host device of claim 1, wherein the workflow generator distributes a total number of copies set for the file to be printed to the selected image forming apparatuses, and generates a workflow including the distributed copies.

3. The host device of claim 2, wherein the workflow generator changes the generated workflow when a number of copies allotted to one of the selected image forming apparatuses increases or decreases.

4. The host device of claim 2, further comprising:
   a storage to store the workflow including the allotted number of copies to the selected image forming apparatuses respectively.

5. The host device of claim 2, wherein the workflow generator equally distributes the total number of copies.

6. The host device of claim 5, wherein the workflow generator equally distributes the total number of copies by dividing the total number of copies by a number of the selected image forming apparatuses, and
   when there is a remainder after dividing the total number of copies by the number of the selected image forming apparatuses, the workflow generator allots a number of additional copies corresponding to the remainder by providing one copy to each of the image forming apparatuses in order from a highest image forming apparatus, respectively.

7. The host device of claim 1, wherein the workflow for the distributed printing comprises:
   scan data, e-mail, fax data, and data stored to a folder.

8. The host device of claim 1, further comprising:
   a display unit to display the generated UI screen; and
   a user input unit to authenticate a user for the workflow generation, and to request the distributed printing through the UI screen displayed in the display unit when the user authentication is completed.

9. The host device of claim 1, wherein the communication unit communicates with at least one user terminal, and
   the host controller controls, when the distributed printing setup is requested from the user terminal, the communication unit to send a UI screen for the workflow generation to the user terminal,
   wherein the selected image forming apparatuses are selectable in the UI screen displayed in the user terminal.

10. The host device of claim 1, wherein the host controller to control, when user authentication is requested from one of the image forming apparatuses and the user authentication is completed, the communication unit to send a workflow list mapped and stored to the user to the one image forming apparatus.

11. The host device of claim 1, wherein the UI generator generates a UI screen illustrating success or failure of the distributed printing executed by the selected image forming apparatuses.

12. A distributed printing setup method, comprising:
   requesting, by a plurality of image forming apparatuses, to generate a workflow for a distributed printing;
   displaying a user interface (UI) screen for the workflow generation;
   selecting the image forming apparatuses in the displayed UI screen;
   generating a workflow by combining distributed printing setup of the selected image forming apparatuses to distribute a printing job of a file to be printed such that the workflow is mapped to a user; and
   sending a workflow list mapped to the user and including the workflow and other workflows mapped to the user therein to one of the selected plurality of image forming apparatuses in response to a user authentication succeeding to allow a user to select from among the workflow and the other workflows within the workflow list such that the printing job is distributedly performed among the selected plurality of image forming apparatuses,
   wherein the workflow is used for distributing a number of copies of a same file to the selected plurality of image forming apparatuses.

13. The distributed printing setup method of claim 12, wherein the generating operation comprises:
   distributing a total number of copies of the file to be printed to the image forming apparatuses; and
   generating a workflow including the distributed numbers of copies.

14. The distributed printing setup method of claim 13, wherein the generated workflow is changed when the number of copies distributed to one of the selected image forming apparatuses increases or decreases.

15. The distributed printing setup method of claim 13, wherein the workflow including the distributed numbers of copies is storable with respect to the selected image forming apparatuses respectively.

16. The distributed printing setup method of claim 13, wherein the distributing operation equally distributes the total number of copies to the selected image forming apparatuses.

17. The distributed printing setup method of claim 16, wherein the distributing operation equally distributes the total number of copies by dividing the total number of copies by a number of the selected image forming apparatuses, and
when there is a remainder after dividing the total number of copies by the number of the selected image forming apparatuses, the distributing operation allots a number of additional copies corresponding to the remainder by providing one copy to each of the image forming apparatuses in order from a highest image forming apparatus, respectively.

18. The distributed printing setup method of claim 12, wherein the workflow for the distributed printing comprises: scan data, e-mail, fax data, and data stored to a folder.

19. The distributed printing setup method of claim 12, further comprising:
generating a UI screen illustrating success or failure of the distributed printing executed by the selected image forming apparatuses.

20. The distributed printing setup method of claim 19, wherein an image forming apparatuses which fails the distributed printing among the selected image forming apparatuses, re-prints the failed copies.

21. A distributed printing system, comprising:
a plurality of image forming apparatuses;
a host device including a user interface (UI) generator to display a UI screen to allow a user to select two or more of the plurality of image forming apparatuses to distribute printing jobs, and a workflow generator to generate a workflow by combining a distributed printing setup of the selected image forming apparatuses to distribute the respective printing and to send a workflow list mapped to the user and including the workflow and other workflows mapped to the user therein to one of the to the selected image forming apparatus in response to a user authentication succeeding to allow a user to select from among the workflow and the other workflows within the workflow list such that the printing job is distributedly performed among the selected plurality of image forming apparatuses,
wherein the workflow is used for distributing a number of copies of a same file to the selected plurality of image forming apparatuses.

22. The system of claim 21, wherein the workflow generator distributes a total number of print jobs among the selected image forming apparatuses such that a number of printing jobs distributed to each of the selected image forming apparatuses differ from each other by no more than one print job.

23. A distributed printing method, comprising:
accessing a host device;
displaying a user interface (UI) screen;
selecting two or more of the plurality of image forming apparatuses from the user interface screen which to distribute printing jobs;
generating workflow by combining a distributed printing setup of the selected image forming apparatuses to distribute the respective printing jobs by distributing a total number of print jobs among the selected image forming apparatuses such that a number of printing jobs distributed to each of the selected image forming apparatuses differ from each other by no more than one print job; and
sending a workflow list mapped to the user and including the workflow and other workflows mapped to the user therein to one of the selected plurality of image forming apparatuses in response to a user authentication succeeding to allow a user to select from among the workflow and the other workflows within the workflow list such that the printing job is distributedly performed among the selected plurality of image forming apparatuses,
wherein the workflow is used for distributing a number of copies of a same file to the selected plurality of image forming apparatuses.

24. A non-transitory computer-readable recording medium having embodied thereon a computer program to execute a method, wherein the method comprises:
accessing a host device;
displaying a user interface (UI) screen;
selecting two or more of the plurality of image forming apparatuses from the user interface screen which to distribute printing jobs;
generating workflow by combining a distributed printing setup of the selected image forming apparatuses to distribute the respective printing jobs by distributing a total number of print jobs among the selected image forming apparatuses such that a number of printing jobs distributed to each of the selected image forming apparatuses differ from each other by no more than one print job; and
sending a workflow list mapped to the user and including the workflow and other workflows mapped to the user therein to one of the selected plurality of image forming apparatuses in response to a user authentication succeeding to allow a user to select from among the workflow and the other workflows within the workflow list such that the printing job is distributedly performed among the selected plurality of image forming apparatuses,
wherein the workflow is used for distributing a number of copies of a same file to the selected plurality of image forming apparatuses.

* * * * *